United States Patent [19]

Phung et al.

[11] Patent Number: 5,753,753
[45] Date of Patent: May 19, 1998

[54] HYDROLYSIS OF POLYVINYL AKLAENOATES

[75] Inventors: Kien Van Phung, Allentown; Dennis Sagl, Bethlehem, both of Pa.

[73] Assignee: Air Products and Chemicals, Inc., Allentown, Pa.

[21] Appl. No.: 803,172

[22] Filed: Feb. 19, 1997

[51] Int. Cl.$^6$ .................................................. C08F 16/06
[52] U.S. Cl. ........................... 525/60; 525/56; 525/61; 525/62; 525/328.1; 525/328.2; 525/328.9; 525/329.7; 525/329.8; 525/330.2; 525/330.3; 525/330.4; 525/330.6; 526/319; 526/330; 526/331; 528/487
[58] Field of Search .................... 525/60, 61, 56, 525/62, 328.1, 328.2, 328.9, 329.7, 329.8, 330.2, 330.3, 330.4, 330.6; 526/319, 330, 331; 528/487

[56] References Cited

U.S. PATENT DOCUMENTS

| | | |
|---|---|---|
| 3,487,061 | 12/1969 | Bristol . |
| 3,510,463 | 5/1970 | Bristol . |
| 3,884,892 | 5/1975 | Winkler et al. . |
| 4,027,079 | 5/1977 | McClain et al. . |
| 4,200,708 | 4/1980 | McClain . |
| 4,208,528 | 6/1980 | McClain .......................... 525/60 |
| 5,187,226 | 2/1993 | Kamachi et al. . |
| 5,194,492 | 3/1993 | Pinschmidt et al. . |
| 5,300,566 | 4/1994 | Pinschmidt et al. . |

*Primary Examiner*—John M. Cooney, Jr.
*Attorney, Agent, or Firm*—Russell L. Brewer

[57] ABSTRACT

This invention relates to an improved process for producing a vinyl alcohol containing polymer having a narrow particle size without substantial reactor fouling. The process for producing the vinyl alcohol containing polymer involves hydrolyzing a vinyl ester containing polymer, e.g., a polymer containing polymerized vinyl alkanoate units in the presence of an alcoholic medium and a hydrolysis catalyst in the presence of an alcoholic medium having finely divided, inert material such as an alkali metal carbonate dispersed therein. The finely divided inert material acts as nucleating sites for the polyvinyl alcohol as it precipitates from the solution during hydrolysis.

9 Claims, No Drawings

HYDROLYSIS OF POLYVINYL AKLAENOATES

TECHNICAL FIELD OF THE INVENTION

This invention relates to a process for the production of vinyl alcohol containing polymers by the hydrolysis of polyvinyl alkanoates, particularly polyvinyl acetate and copolymers thereof.

BACKGROUND OF THE INVENTION

The prior art is replete with continuous and batch processes for the production of polyvinyl alcohol by the hydrolysis of polyvinyl esters, typically polyvinyl alkanoates. One of the common procedures for hydrolyzing polyvinyl esters has been to disperse the polyvinyl ester in an alcohol solvent and then continually add either strong acid or base, e.g., alkali metal hydroxide, in an aqueous medium under controlled conditions. On continued addition of the hydrolyzing agent, the polyvinyl alcohol forms a gel which precipitates from solution. The resulting gel then is recovered from the dispersion, washed and dried. The solid product then is ground and bagged for shipment.

Representative patents which show the production of a polyvinyl alcohol and copolymers thereof by the hydrolysis of polymers containing polymerized vinyl ester units are as follows:

U.S. Pat. No. 3,487,061 discloses a continuous production of gel-resistant polyvinyl alcohol by feeding a solution of polyvinyl ester in a hydrolytic alcohol, such as methanol, to an alcoholysis mixture containing an alcoholysis catalyst, maintaining a dissolved polymer content of less than 1% by weight, and continuously withdrawing a slurry of the polyvinyl alcohol/solvent mixture from the alcoholysis medium.

U.S. Pat. No. 3,510,463 discloses a process for the suspension alcoholysis of ethylene/vinyl ester copolymer pellets. Suspension alcoholysis is accomplished by suspending the polyvinyl ester precursor in a lower alcohol reaction medium containing an alcohol-miscible non-reactive swelling agent and an alcoholysis catalyst. By maintaining the copolymer in suspension, alcoholysis can be controlled within a range of from a few percent to upwards of 80 percent.

U.S. Pat. No. 3,884,892 discloses a method for producing polyvinyl alcohol by the catalytic alcoholysis of polyvinyl esters, e.g., polyvinyl alkanoates and particularly polyvinyl acetate by charging an alcoholic polyvinyl ester solution to a reactor, adding a layer of an alcohol having a lower specific gravity than the alcoholic ester solution to the top of the alcoholic ester solution and a layer of liquid alcohol having a higher specific gravity below the alcohol ester solution, stirring the contents for a time sufficient to effect alcoholysis and then recovering the polyvinyl alcohol therefrom. Although the patent discloses that both alkaline and acid catalysts could be used for catalyzing the alcoholysis, the alkaline catalysts, such as sodium or potassium hydroxide, were preferred.

U.S. Pat. No. 4,027,079 discloses a process for producing saponified ethylene-vinyl acetate interpolymers having a particle size of about 10 microns or less. In the basic process, the ethylene-vinyl acetate interpolymer is dispersed in an aqueous medium containing a ethylene oxide-propylene oxide block copolymer dispersing agent and saponified in the base as a saponification agent. An ethylene oxide-propylene oxide block copolymer is used as a dispersing agent. The patentees found that by controlling the amount of residual salt in a hydrolyzed resin to less than 0.1% finely divided particles of less than 10 microns could be produced.

U.S. Pat. No. 4,200,708 discloses a process for producing finely divided, saponified ethylene-vinyl acetate copolymer particles by first forming a dispersion of the copolymer in an aqueous dispersion medium containing a dispersing agent and then saponifying the dispersed copolymer employing a strong base as the saponifying agent. Agents used to assist in dispersing the copolymer in aqueous dispersion include nonionic, anionic, cationic and amphoteric surface active agents. During saponification, spherical particles are formed with average diameters ranging from 20 microns to about 500 microns.

U.S. Pat. No. 5,187,226 discloses a process for the production of polyvinyl alcohol having a high syndiotacticity and a high degree of polymerization. In producing the polyvinyl alcohol polymer, a vinyl ester containing polymer is hydrolyzed in the presence of an alkali metal hydroxide in a solvent capable of dissolving or swelling the polyvinyl ester containing polymer. A dissolved oxygen content of less than $5\times10^{-4}$ mols per liter is maintained in the hydrolysis step.

U.S. Pat. No. 5,194,492 discloses a process for producing vinyl alcohol/vinyl amine copolymers by the hydrolysis of a vinyl acetate/N-vinylformamide copolymers. Hydrolysis of the copolymers is effected by base or acid hydrolysis using an alkali metal hydroxide in aqueous solution. The products are recovered by precipitation or solvent evaporation.

Also, U.S. Pat. No. 5,194,492 and U.S. Pat. No. 5,300,566 describe a process for producing vinyl alcohol/N-vinylformamide copolymers by basic saponification of vinyl acetate/N-vinylformamide copolymers in methanol.

SUMMARY OF THE INVENTION

This invention relates to an improved process for producing a vinyl alcohol containing polymer having a narrow particle size without substantial reactor fouling. The basic process for producing the vinyl alcohol containing polymers involves hydrolyzing polymers containing polymerized vinyl alkanoate units in the presence of an alcoholic medium and a hydrolysis catalyst carried in an aqueous medium. As the polymer hydrolyzes it precipitates in the medium employed for dispersing the polyvinyl alkanolate polymer. The improvement in the basic process resides in incorporating finely divided, inert material dispersed in the alcoholic medium and then hydrolyzing the polymers containing hydrolyzed alkanote units in the alcoholic medium containing the inert material at a temperature from about 10° to 70° C. The finely divided, inert material has a water solubility greater than 5 grams per 100 grams water at 25° C. and has a solubility in the alcoholic medium of less than 1 gram per 100 grams alcoholic medium at 25° C. The finely divided inert material acts as nucleating sites for the vinyl alcohol containing polyymer generating small particle vinyl alcohol containing particles as they precipitate from solution. Because the vinyl alcohol polymers are formed into small particles, it allows the process to be operated at a higher polymer concentration without forming lumps or fouling the reactor.

There are numerous advantages associated with the process of this invention and these include:

an ability to convert polyvinyl esters, e.g., polyvinyl acetate, to vinyl alcohol containing polymers in granulate form at reasonably high polymer concentration;

an ability to produce high polymer concentration product without producing substantial product in "lumpy" product form which requires grinding prior to use;

an ability to operate at high polymer concentrations without substantial reactor fouling; and, an ability to generate product having a relatively uniform particle size distribution.

BRIEF DESCRIPTION OF THE SEVERAL VIEWS OF THE DRAWINGS

Not Applicable

DETAILED DESCRIPTION OF THE INVENTION

The polyvinyl esters which are employed in vinyl alcohol polymer producing processes are those polyvinyl esters of carboxylic acids and lower alcohols having from 1–7 carbon atoms, e.g., polyvinyl acetate, polyvinyl formate, polyvinyl propionate, polyvinyl butyrate, polyvinyl pivalate and so forth. Preferred are the vinyl esters where the ester reside has from 1–4carbon atoms. Copolymers of these vinyl esters can also be utilized, as noted in the prior art, and representative copolymers are ethylene/vinyl acetate having ethylene concentrations of from about 5–85 mole percent and a vinyl acetate content of from about 15–95% by weight, vinyl acetate/N-vinylformamide copolymers having from about 60 to 95 weight percent vinyl acetate, and copolymers of vinyl acetate and alpha, beta-unsaturated carboxylic acids such as acrylic acid, methacrylic acid, and crotonic acid, alpha, beta-unsaturated nitrites such as acrylonitrile and methacrylonitrile, amides such as acrylamide, methacrylamide and N-methylolacrylamide and so forth. In the latter cases, the mole percent of acids, amides, nitriles, etc. typically range from about 0.5 to 20 weight percent, preferably less than 15 weight percent.

In the process for producing the vinyl alcohol containing polymers, the vinyl ester-containing polymers are dissolved in a solvent, typically a lower alkyl alcohol having from about 1–4 carbon atoms such as methanol, ethanol, isopropanol, n-butanol or tert-butanol. Other solvents conventionally used can be used here, although methanol, as in conventional processes, is the preferred solvent for dissolving the polymer containing polmerized vinyl ester units, particularly polyvinyl alcohol.

Hydrolysis is carried out in conventional manner using a catalyst comprising an alkali metal hydroxide or alkoxide, with sodium or potassium being the preferred alkali metal used in the catalytic hydrolysis of the vinyl ester containing polymer. Conditions for effecting hydrolysis are essentially the same as employed in conventional prior art processes which typically range from 10° to 70° C. Typically, hydrolysis is carried out at a temperature of about 20°–40° C. with alkali metal hydroxide catalyst concentrations being from about 1–4% by the weight. In the present case, the size of the particles is influenced by temperature and higher temperatures result in producing fines. In the preparaiton of polyvinyl alcohol it is preferred to employ a temperature of r=from about 20° to 30° C.

A key to the improvement in the process for producing vinyl alcohol containing polymers lies in the incorporation of "solid seeds" in the alcoholic hydrolysis medium. The seeds provide nucleating sites for the vinyl alcohol polymer as it precipitates from the medium. Because the vinyl alcohol polymer precipitates on the solid seeds formed by the inorganic or particulate material, one has a mechanism for controlling the particle size of the vinyl alcohol polymer and for reducing the precipitation of vinyl alcohol containing polymer on the surface structure of the reactor and agitation equipment. The presence of the nucleating agent also permits one to operate the hydrolysis step at a higher polymer concentration, e.g., up to 20 percent by weight.

The seed which is used to provide nucleating sites for the vinyl alcohol containing polymer during precipitation is comprised of an a water soluble (>5 grams per 100 grams water at 25° C. and insoluble in the alcoholic medium (<1 gram per 100 grams alcoholic medium at 25° C.). The seed should be inert with respect to the vinyl ester containing polymer and to the product vinyl alcohol containing polymer. In addition, the seed material incorporated in the hydrolysis medium should be inert with respect to the solvent and the alkali metal (including the ammonium ion) hydrolysis catalyst employed in the hydrolysis step. Preferred seed materials include but are not limited to water soluble inorganic salts, e.g., carbonates, bicrbonates, sulfates and phosphates such as sodium, potassium, and lithium carbonate, sodium, potassium, and lithium bicarbonate, sodium and potassium sulfate, sodium and potassium bisulfate, sodium and potassium sulfite, sodium and potassium bisulfite, di- and triisodium phosphate and the like.

The seed material can be generated in situ or can be added with the catalyst solution which then is added to the alcoholic hydrolysis medium. Preferably, the seed material is dissolved in water and slowly added to the alcoholic medium containing the vinyl alkanoate dispersed in the alcoholic medium. The concentration of inert seed forming material typically will range from about 0.1 to 5% by weight preferably 0.3 to 1% of the polymer containing polmerized units of vinyl alkanoate. At levels below about 0.3, there is a tendency for some of the polymer to precipitate into large clumps and some to preciitate as a powder. At levels greater than about 1% by weight of the polymer, no further and significant advantages are observed.

After the polymer has been hydrolyzed and precipitated in the alcoholic medium, the polymer is recovered typically by filtration. The product then may be washed with water to remove the water soluble salt held within the polymer precipitate.

The following examples are provided to illustrate various embodiments of the invention and are not intended to restrict the scope thereof. All parts are parts by weight and all percentages are expressed as weight percentages unless otherwise specified.

EXAMPLE 1

Seed Saponification with Sodium Bicarbonate

A series of seed saponification procedures (Experiments A, B & comparative experiment C) were utilized to produce polyvinyl alcohol from polyvinyl acetate. More particularly, in a resin kettle equipped with pitch-bladed stirrer and dropping funnel, a solution of one gram sodium bicarbonate dissolved in 6 grams of water was added dropwise to 350 grams of methanol to generate a fine dispersion, then 17 grams of 50% aqueous solution of sodium hydroxide was added and the mixture heated to 40° C.

A solution of 1000 grams of polyvinyl acetate in methanol (30% solids) having a weight average molecular weight of 100,000 was added under stirring (120 rpm) within 3.5 hours. An additional 17 grams 50% sodium hydroxide diluted in 30 grams methanol was added once the polymer addition was completed. The saponification was continued for 30 minutes and the slurry neutralized with 30 grams glacial acetic acid. The product was recovered from the medium by filtration and characterized. This Experiment A product was characterized as PVOH and incorporated about 0.33% by weight of sodium bicarbonate based upon polymer.

Experiment B

The procedure described for Experiment A was repeated except that saponification was conducted at 20° C. instead of 40° C. for the pupose of determining the effect of temerature on the nature of the product produced. The product was characterized as PVOH B.

Experiment C

The procedure described for Experiment A was repeated except that the sodium bicarbonate used as a seed in the formation of PVOH A was omitted.

The product PVOH materials were evaluated as to the degree of hydrolysis, yields determined and screened. The results are in Table 1.

TABLE 1

| Particle Size Distribution | | | |
|---|---|---|---|
| | PVOH | | |
| | A | B | C |
| sodium bicarbonate | 0.33% | 0.33% | none |
| Temperature | 40° C. | 20° C. | 40° C. |
| Screen mesh size (micron) | Polyvinyl Alcohol Fraction in % by weight | | |
| on 1400 | 3.0 | 1.2 | 87.6 |
| Through 1400 on 850 | 6.8 | 2.4 | 6.2 |
| Through 850 on 425 | 25.1 | 36.7 | 2.4 |
| Through 425 on 250 | 16.5 | 28.9 | 2.8 |
| Through 25 on 180 | 13.7 | 17.5 | trace |
| Through 180 on 150 | 11.6 | 6.7 | trace |
| Through 150 | 23.3 | 6.6 | 0.5 |

All the experiments A-C produced a PVOH with a hydrolysis value greater than 99.4% at a quantitative yield of 11% of solid. The stirrer and the reactor walls were coated with a layer of the comparative PVOH C while the reactor walls and stirrer were clean when the procedures for providing polyvinyl alcohol polymers A and B were employed.

The screening results show that a substantial portion of Polyvinyl Alcohols A and B had a screen size between 150 and 425 mesh. PVOH A hydolyzed at 40°C. had about 25% of fines that passed 150 mesh screen while the POH B which was processed at 20° C. had fewerr fines (passing 150 mesh) and a larger portion of product retained on 180 to 425 mesh screen. the higher saponification temperature employed in producing PVOH A resulted in a larger proportion of product having a particle size greater than 250 mesh.

EXAMPLE 2

Seed Saponification of

Polyvinyl Acetate/N-Vinyl Formamide Copolymer

The seed saponification procedure of Example 1 was repeated except that a solution of a copolymer of vinyl acetate and N-vinylformamide (NVF) was substituted for the polyvinyl acetate homopolymer. Specifically, an aqueous solution of sodium carbonate (7 grams, 15%) was added slowly at a stir rate of 150 rpm to a solution of 340 grams methanol containing 3 grams sodium hydroxide. The temperature of the mixture was maintained at 22°–25° C. and a solution of polyvinyl acetate-co-NVF (600 grams, 27.5% in methanol; number average molecular weight of 100,000, containing 6 mole % N-vinylformamide) was added to the slurry over 2.75 hr. (Approximately, 0.64% by weight of sodium carbonate based upon polymer) After addition of the copolymer solution, the stirring was continued for 1.0 hr. A granulated product with over 85% weight fraction at 1000–2000 microns was obtained in quantitative yield. The stirrer and the reactor wall were clean.

A similar experiment was carried out in the absence of sodium carbonate dispersion resulted in a vinyl alcohol containing copolymer having big lumps. Also, the stirrer shaft and the reactor wall were coated with a thick layer of polymeric material.

It was concluded that the larger size particles were due to the reduced temperature (~20° C. as opposed to about 40° C. in Example 1). The data did not suggest dissimilar results because of the copolymer vis-a-vis the homopolymer or the difference in seed material.

EXAMPLE 3

Seed Saponification with Sodium Carbonate

A solution of 7 grams of an aqueous solution of 15% sodium carbonate is added slowly under stirring at room temperature to 350 grams of methanol solution containing 23 grams of a 50% aqueous sodium hydroxide to generate a dispersion. A solution of 1000 grams of 35% of polyvinyl acetate (number average molecular weight of about 100, 000) in methanol is added within 3.5 hours. The level of sodium carbonate was abput 0.33% by weight of the polyvinyl acetate. A PVOH having a hydrolysis value of 99.6% and particles having the following distribution through a sonic sieve was obtained:

TABLE 2

| Size (micron) | Weight fraction (%) |
|---|---|
| 180 | 15 |
| 250 | 30 |
| 450 | 45 |
| larger than 450 | 10 |

The results in Table 2 show that a large portion of the product fit within a particle size of 180 to 450 mesh. Only a small fraction was smaller that 450 mesh.

EXAMPLE 4

Seed Saponification of Vinyl Acetate/N-Vinylformamide Copolymer

The seed saponification procedure of Example 2 was repeated at higher temperature (50°–55° C.) and shorter reaction time. An aqueous solution of sodium carbonate (5.00 grams, 15%) was added slowly with stirring to a solution of sodium hydroxide (1.50 grams) in methanol (300 grams), resulting in a fine dispersion of sodium carbonate particles in methanol. (The weight percent sodium carbonate based upon polyvinyl acetate was about 0.58%.) The temperature of the mixture was maintained at 50°–55° C., and a polymer solution of polyvinyl acetate-co-N-vinylformamide (652 grams, 20% in methanol; number average molecular weight of 100,000 containing 6 mole% NVF) was added to this mixture over 1.25 hours. After addition of the polymer solution was completed, additional sodium hydroxide (1.50 grams) was added and the slurry was stirred for an additional 0.5 hour. The polyvinyl alcohol-co-N-vinylformamide product was obtained by filtration and was in the form of a free-flowing powder. No fouling on either the reactor walls or stirrer was observed.

A similar experiment was carried out in the absence of sodium carbonate. This resulted in polyvinyl alcohol-co-N-vinylformamide which contained large chunks. In addition, the reactor wall and stirrer shaft were coated with a thick layer of polymeric material.

The results show that a temperature of 50°–55° C. was suited for hydolysis.

EXAMPLE 5

Seed Saponification of Vinyl Acetate/N-Vinylformamide Copolymer

The procedure of Example 2 was essentially repeated except that 0.2% $Na_2CO_3$ was used. More specifically, an aqueous solution of sodium carbonate (2.00 grams, 15%) was added slowly with stirring to a solution of sodium hydroxide (1.65 grams) in methanol (320 grams), resulting in a fine dispersion of sodium carbonate particles in methanol. (The level of sodium carbonate was 0.21% ase upon polyvinyl acetate) The temperature of the mixture was maintained at 50°–55° C., and a solution of polyvinyl acetate-co-N-vinylformamide (575 grams, 25% in methanol; number average molecular weight of 100,000 containing 6 mole % NVF) was added to this mixture over 1.75 hours. After addition of the polymer solution was completed, additional sodium hydroxide (1.65 grams) was added and the slurry was stirred for an additional 1.0 hour. The polyvinyl alcohol-co-N-vinylformamide product was obtained by filtration and was in the form of a free-flowing powder with a few larger particles. Minor fouling on the reactor walls was observed and some coaglum was observed on the stirrer shaft.

The results show that at a level of 0.21% sodium carbonate some fouling occured in contrast to that at Example 2 at a 0.33% level. This shows the seed material should be present in an amount of at least 0.3%. Example 4 showed the use of higher levels of sodium carbonate but there were no signifcant advantages associated with the highere seed level over that at the lower (0.33%) level.

What is claimed is:

1. In a process for producing a polymer containing vinyl alcohol units which comprises the steps:

hydrolyzing a polymer containing polymerized vinyl alkanoate units in the presence of an alcoholic medium and a hydrolysis catalyst, said hydrolyzing carried out under conditions for forming a polymer containing vinyl alcohol units;

precipitating said polymer containing vinyl alcohol units in particulate form in the alcoholic medium; and, recovering the precipitated polymer containing vinyl alcohol units in particulate form, the improvement for generating polymer containing vinyl alcohol units in particulate form within a narrow particle size which comprises:

(a) incorporating a finely divided, inert material in said alcoholic medium, said finely divided material having a water solubility greater than 5 grams per 100 grams water at 25° C. and a solubility in the alcoholic medium of less than 1 gram per 100 grams alcoholic medium at 25° C., said finely divided inert material selected from the group consisting of alkali metal and ammonium carbonates, bicarbonates, sulfates, bisulfates, sulfites, bisulfites and phosphates; and then, (b) hydrolyzing the polymer containing vinyl alkanoate units in the alcoholic medium incorporating said finely divided inert material at a temperature from about 10 to 70° C.

2. The process of claim 1 wherein the inert material is incorporated in an amount of from 0.1 to 5 percent by weight of the polymer containing polymerized vinyl alkanoate units.

3. The process of claim 2 wherein in said vinyl ester polymer containing polymerized vinyl alkanoate units wherein the ester residue has from 1 to 4 carbon atoms.

4. The process of claim 2 wherein the hydrolysis of said polyvinyl acletate is carried out in the presence of an alkanol selected from the group consisting of methanol, ethanol, propanol, and butanol.

5. The process of claim 4 wherein said polymer containing polymerized units of vinyl alkanoate acetate is a vinyl acetate homopolymer or a copolymer of vinyl acetate and a monomer selected from the group consisting of ethylene, $C_{1-4}$ alkyl esters of acrylic or methacrylic acid, and N-vinyl formamide.

6. The process of claim 1 wherein the level of inert material employed as a seed is from 0.3 to 1 percent by weight of the polymer containing polymerized units of vinyl alkanoate.

7. The process of claim 3 wherein the polymer containing polymerized units of vinyl alkanoate is polyvinyl acetate.

8. The process of claim 6 wherein the inert material is sodium carbonate or sodium bicarbonate.

9. The process of claim 6 wherein the alcohol is methanol.

* * * * *